United States Patent
Lee et al.

(10) Patent No.: US 7,330,008 B2
(45) Date of Patent: Feb. 12, 2008

(54) APPARATUS FOR SENSING POSITION OF VEHICLE SEAT

(75) Inventors: Cheol-Seob Lee, Kyungsangbuk-Do (KR); Seok-Il Kim, Kyungsangbuk-Do (KR); Dug-Su Yang, Kyungsangbuk-Do (KR); You-Sik Choi, Kyungsangbuk-Do (KR)

(73) Assignee: Tyco Electronics AMP Korea Ltd., Kyungsangbuk-Do (KR)

( * ) Notice: Subject to any disclaimer, the term of this patent is extended or adjusted under 35 U.S.C. 154(b) by 1 day.

(21) Appl. No.: 11/371,585

(22) Filed: Mar. 9, 2006

(65) Prior Publication Data

US 2006/0214402 A1    Sep. 28, 2006

(30) Foreign Application Priority Data

Mar. 9, 2005    (KR)    ...... 10-2005-0019704
Feb. 2, 2006    (KR)    ...... 10-2006-0010153

(51) Int. Cl.
*G05B 5/00*    (2006.01)

(52) U.S. Cl. ............ 318/466; 318/467; 318/468

(58) Field of Classification Search ........ 318/466, 318/468, 467; 33/706; 219/130.32; 180/271, 180/467, 468, 445, 443, 444, 136, 782, 812, 180/432

See application file for complete search history.

(56) References Cited

U.S. PATENT DOCUMENTS

| | | | |
|---|---|---|---|
| 5,218,182 A * | 6/1993 | Vogel et al. | ...... 219/130.32 |
| 2004/0149507 A1 * | 8/2004 | Baskin et al. | ...... 180/271 |
| 2004/0181958 A1 * | 9/2004 | Rodi | ...... 33/706 |

FOREIGN PATENT DOCUMENTS

JP    2002-213904    7/2002

* cited by examiner

*Primary Examiner*—Karen Masih
(74) *Attorney, Agent, or Firm*—Barley Snyder LLC

(57) ABSTRACT

An apparatus for detecting a vehicle seat position is disclosed. The apparatus includes a hall sensor for detecting a target position according to a flux variation; a first power-supply unit for activating the hall sensor in an active period of a received drive-voltage pulse; and a second power-supply unit for providing an auxiliary power-supply signal to activate the hall sensor in an inactive period of the drive-voltage pulse. Therefore, the apparatus can effectively address two-pin hall sensor's problems caused by hysteresis characteristics.

23 Claims, 10 Drawing Sheets

APPARATUS FOR SENSING POSITION OF VEHICLE SEAT

FIELD OF THE INVENTION

The present invention relates to an apparatus for detecting the position of a vehicle seat, and more particularly to an apparatus for detecting the position of a vehicle seat using a two-pin hall sensor.

BACKGROUND OF THE INVENTION

Generally, a vehicle includes an air-bag device for protecting a vehicle driver and passengers from receiving physical shock caused by a vehicle crash or a head-on collision between vehicles. The above-mentioned air-bag devices installed in vehicles as optional devices have been widely used throughout the world. Specifically, air-bag devices for vehicle drivers have been required in most vehicles in recent times, and air-bag device for protecting passengers from danger or other air-bag devices for protecting vehicle drivers or passengers from a lateral collision have also been widely used throughout the world.

If vehicles collide with each other, a conventional determines the presence or absence of the vehicle collision. Upon a vehicle collision, the air-bag device is rapidly operated by an electric signal generated by the vehicle collision. For example, when the air-bag device is operated by the vehicle collision on the condition that a vehicle driver traveling in his or her vehicle has moved a vehicle seat to the front most area according to a body type of the vehicle driver, a distance between the vehicle driver and the air-bag device becomes short, such that the vehicle driver may be injured or suffocate d by impact caused by the air-bag device's operation.

In order to solve the above-mentioned problems, a variety of devices have recently been proposed, for example, devices for detecting the location of a vehicle seat and selectively operating the air-bag device according to the detected location. As well known to those skilled in the art, a representative scheme for detecting the vehicle seat location in the above-mentioned devices includes a noncontact-type sensor, for example, a magnet, a hall sensor, an ultrasonic sensor, etc. In addition, another scheme for detecting the vehicle seat moving along a rail using a contact-type sensor has also been recently proposed. Specifically, the noncontact-type sensors based on the magnet and the hall sensor have been more widely used than other sensors.

Two-pin hall sensors and three-pin hall sensors have been widely used for detecting the vehicle seat location. It should be noted that the two-pin hall sensor and the three-pin hall sensor have the following disadvantages.

Firstly, a representative example of the two-pin hall sensor is "TLE4976L" manufactured by Infineon Company. In the TLE4976L sensor, a first pin contained in the two-pin hall sensor serves as a power-supply pin, and a second pin contained in the same serves as a ground pin. One pin of the two pins is not internally connected, such that the exemplary hall sensor may be generally referred to as a two-pin hall sensor.

The above-mentioned two-pin hall sensor is connected to an air-bag controller (ACU) for providing a supply-voltage pulse. The above-mentioned ACU controls the opening of an air-bag according to a variation in a current level $I_{Slow}$ and $I_{Shigh}$ applied to the two-pin hall sensor. If a target (may be a magnet) is located in a hysteresis period as shown in FIG. 1, a current level applied to the two-pin hall sensor does not maintain a predetermined level (i.e., a high or low level), and moves between the high level $I_{Shigh}$ and the low level $I_{Slow}$. For example, the current level is transitioned from the high level $I_{Shigh}$ to the low level $I_{Slow}$ or from the low level $I_{Slow}$ to the high level $I_{Shigh}$, because a power-supply signal is not continuously applied to the ACU. In this case, the ACU determines the presence or absence of an erroneous operation of the hall sensor, such that a warning lamp is switched on or off according to the determined result.

Therefore, the vehicle driver wrongly determines the presence of an erroneous operation of an air-bag system although there is no error in the air-bag system, such that an after-sale service is unnecessarily required.

In order to solve the above-mentioned problems, the three-pin hall sensors have been used. A representative example of the three-pin hall sensor is "TLE4906L" manufactured by Infineon Company. In the TLE4906L sensor, a first pin contained in the three-pin hall sensor serves as a power-supply pin, a second pin serves as a ground pin, and a third pin serves as an output pin configured in the form of an open-collector. A peripheral circuit diagram of the hall sensor for detecting a vehicle seat location using the three-pin hall sensor is depicted in FIG. 2.

As shown in FIG. 2, the three-pin hall sensor 10 receives a power-supply signal via a power-supply pin (Vs), and controls one end of the CPU to be grounded according to the target detection result.

Therefore, the ACU equipped with the three-pin hall sensor controls the opening of an air-bag according to a variation in a current level applied to the three-pin hall sensor. Although unexpected errors occur in the three-pin hall sensor by external impact and electrical impact, a closed loop (P1) caused by resistors R1 and R2 is formed, such that the ACU does not wrongly indicate a malfunction or error of the hall sensor. In other words, since the three-pin hall sensor has no self-diagnosis function, the three-pin hall sensor is unable to detect its malfunction or error under the condition that the malfunction or error has occurred in the three-pin hall sensor, such that the air-bag cannot be controlled by the three-pin hall sensor.

In the meantime, a typical hall sensor module is bolt-connected to a guide track which moves forward and backward with a vehicle seat, such that it has difficulty in the replacement and installation of the above-mentioned typical hall sensor.

SUMMARY

Therefore, the present invention has been made in view of the above problems, and it is an object of the invention to provide an apparatus for solving problems caused by hysteresis characteristics, and maintaining a self-diagnosis function of a sensor, thereby correctly detecting the location of a vehicle seat.

It is another object of the present invention to provide an apparatus for detecting the location of a vehicle seat, the replacement and installation of which can be easily executed.

It is yet another object of the present invention to provide a vehicle seat location detection apparatus equipped with a controller capable of optimally controlling the opening of an air-bag in consideration of a plurality of factors required for the air-bag opening.

It is yet another object of the present invention to provide a vehicle seat location detection apparatus for detecting a vehicle seat location without using an additional target for detecting the vehicle seat location.

In accordance with one aspect of the present invention, these and other objects are accomplished by providing an apparatus for detecting a vehicle seat location comprising a hall sensor for detecting a target location according to a flux variation, a first power-supply unit for activating the hall sensor in an active period of a received drive-voltage pulse and a second power-supply unit for providing an auxiliary power-supply signal to activate the hall sensor in an inactive period of the drive-voltage pulse.

The first power-supply unit includes a first transistor for connecting its emitter terminal to a power-supply pin of the hall sensor and resistors connected between individual base and collector terminals of the first transistor and a pulse input pin, whereby the drive-voltage pulse is applied to the power-supply pin of the hall sensor.

The second power-supply unit includes voltage-division resistors for dividing a battery voltage and a second transistor for connecting its emitter terminal to a connection point of the voltage-division resistors, and transmitting a divided voltage to the power-supply pin of the hall sensor according to a logic level of the drive-voltage pulse received in its base terminal.

The hall sensor is a general two-pin hall sensor.

The hall sensor, the first power-supply unit, and the second power-supply unit are integrated into a single module, and the integrated module is inserted into a bracket connected to a guide track moving forward and backward along with a vehicle seat, such that the integrated module is detachably connected to the bracket.

According to the above-mentioned vehicle seat location detection apparatus, a drive voltage received from a battery is stably applied to a two-pin hall sensor even in an inactive period of the drive-voltage pulse generated from the ACU, such that the ACU can detect a high-level supply current $I_{Shigh}$ or a low-level supply current $I_{Slow}$ even if the target is located in a hysteresis period.

The hall sensor, the first power-supply unit, and the second power-supply unit are integrated into a single module, the integrated module is inserted into a bracket connected to a guide track moving forward and backward along with a vehicle seat, such that the integrated module is detachably connected to the bracket, resulting in greater convenience of its replacement.

BRIEF DESCRIPTION OF THE DRAWINGS

The above objects, and other features and advantages of the present invention will become more apparent after reading the following detailed description when taken in conjunction with the drawings, in which.

DESCRIPTION OF THE EMBODIMENTS

Figure 1:
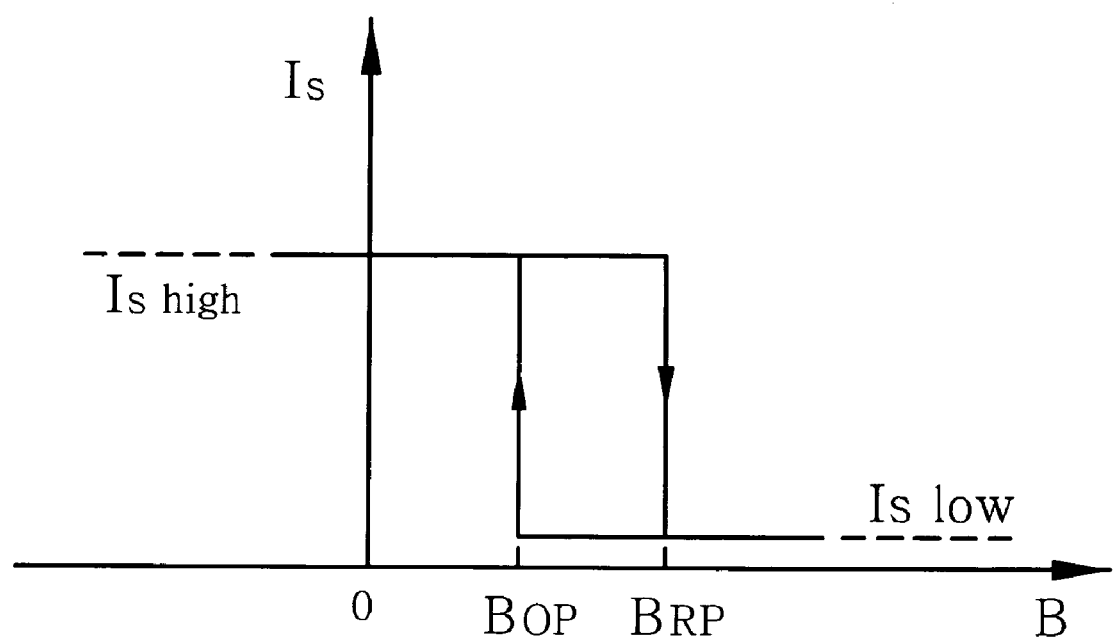
FIG. 1 is a graph illustrating hysteresis characteristics of a two-pin hall sensor.
Figure 2:
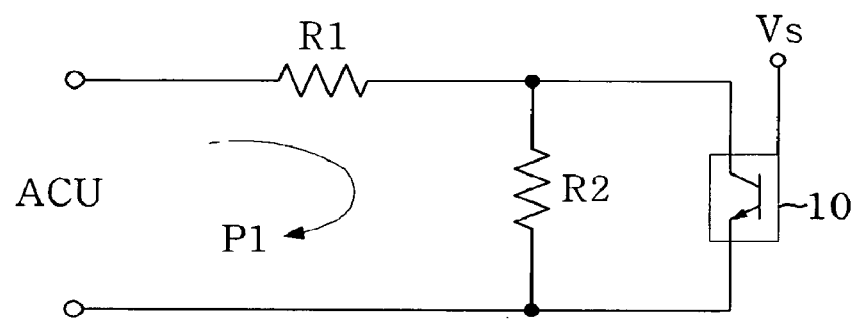
FIG. 2 is a circuit diagram illustrating a peripheral circuit of a three-pin hall sensor to describe problems of the three-pin hall sensor itself.

Now, embodiments of the present invention will be described in detail with reference to the drawings. In the drawings, the same or similar elements are denoted by the same reference numerals even though they are depicted in different drawings. In the following description, a detailed description of known functions and configurations incorporated herein will be omitted when it may make the subject matter of the present invention rather unclear.

Figure 3:
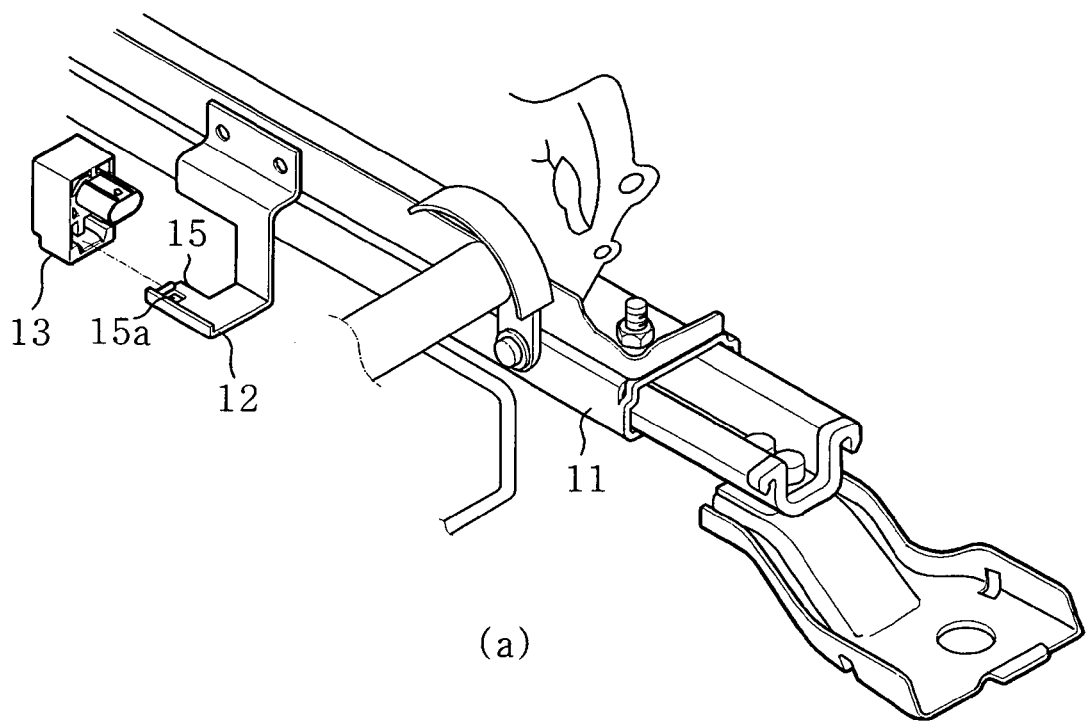
FIGS. 3 and 4 show an installation position and structural characteristics of an apparatus for detecting a vehicle seat location in accordance with an embodiment of the present invention.
Figure 3:
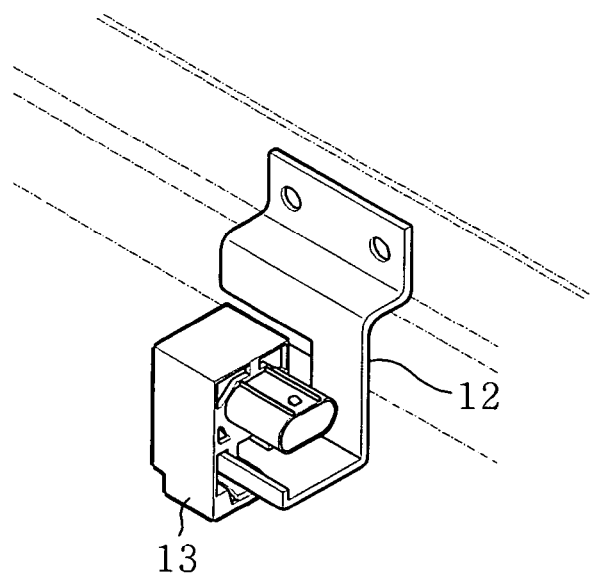
Figure 3:
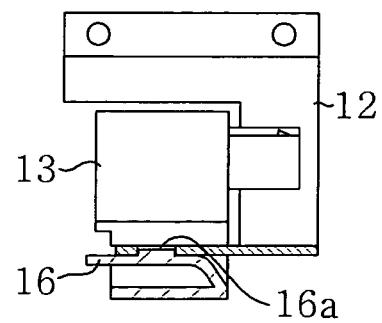
Figure 4:
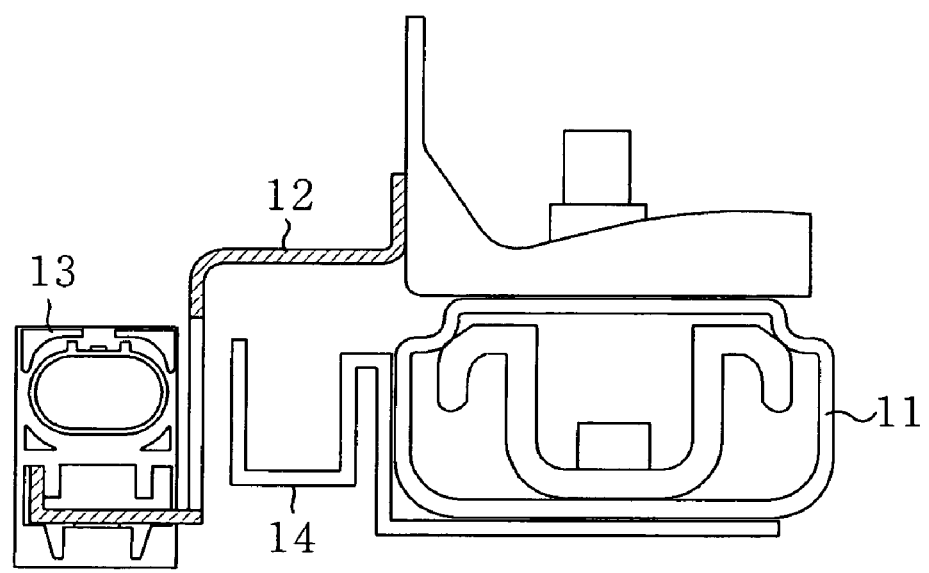

FIGS. 3 and 4 show an installation position of an apparatus for detecting a vehicle seat location in accordance with an embodiment of the present invention.

Referring to FIG. 3, the apparatus for detecting a vehicle seat location according to the present invention is integrated into a single hall sensor module 13, and is designed to be inserted into a bracket 12 bolt-connected to a guide track 11 which moves forward and backward with the vehicle seat.

In other words, as shown in FIG. 3(a), a bracket insertion groove where a bracket coupler 15 is inserted is formed in a lower end of one side of the hall sensor module 13. An elastic fixed piece 16 shown in FIG. 3(c) is formed in the bracket insertion groove. The elastic fixed piece 16 is extended from the bottom of the insertion groove to the outside of a back-surface groove formed at the rear of the insertion groove. A protrusion 16a inserted into a groove 15a formed at the bracket coupler 15 is located at one side of the elastic fixed piece 16, such that it fixes the hall sensor module 13 to the bracket coupler 15.

In the meantime, under the condition that the hall sensor module 13 is fixedly connected to the bracket coupler 15 as shown in FIG. 3(b), an operator puts predetermined pressure on an edge of the elastic fixed piece 16 extended to the outside of back-surface groove of the hall sensor module 13, and at the same time can easily connect/detach the hall sensor module 13 to/from the bracket coupler 15, such that the hall sensor module 13 according to the present invention can be more easily installed or separated than that of a conventional bolt-connection method.

In the meantime, a ferromagnetic target 14 having a predetermined area is installed to a specific location at which a vehicle seat located at the front area must be detected. However, the ferromagnetic target 14 must be fixedly installed to a specific location facing the hall sensor module 13. The reason why the ferromagnetic target 14 must be fixedly installed to the specific location is to detect a forward movement of the vehicle seat by applying a variation to flux density of a magnetic field emitted from the hall sensor module 13.

The above-mentioned apparatus for detecting a vehicle seat location (hereinafter referred to as a vehicle seat location detection apparatus) has been exemplarily disclosed as the hall sensor module 13, and a structural description thereof will hereinafter be described with reference to the annexed drawings.

Figure 5:
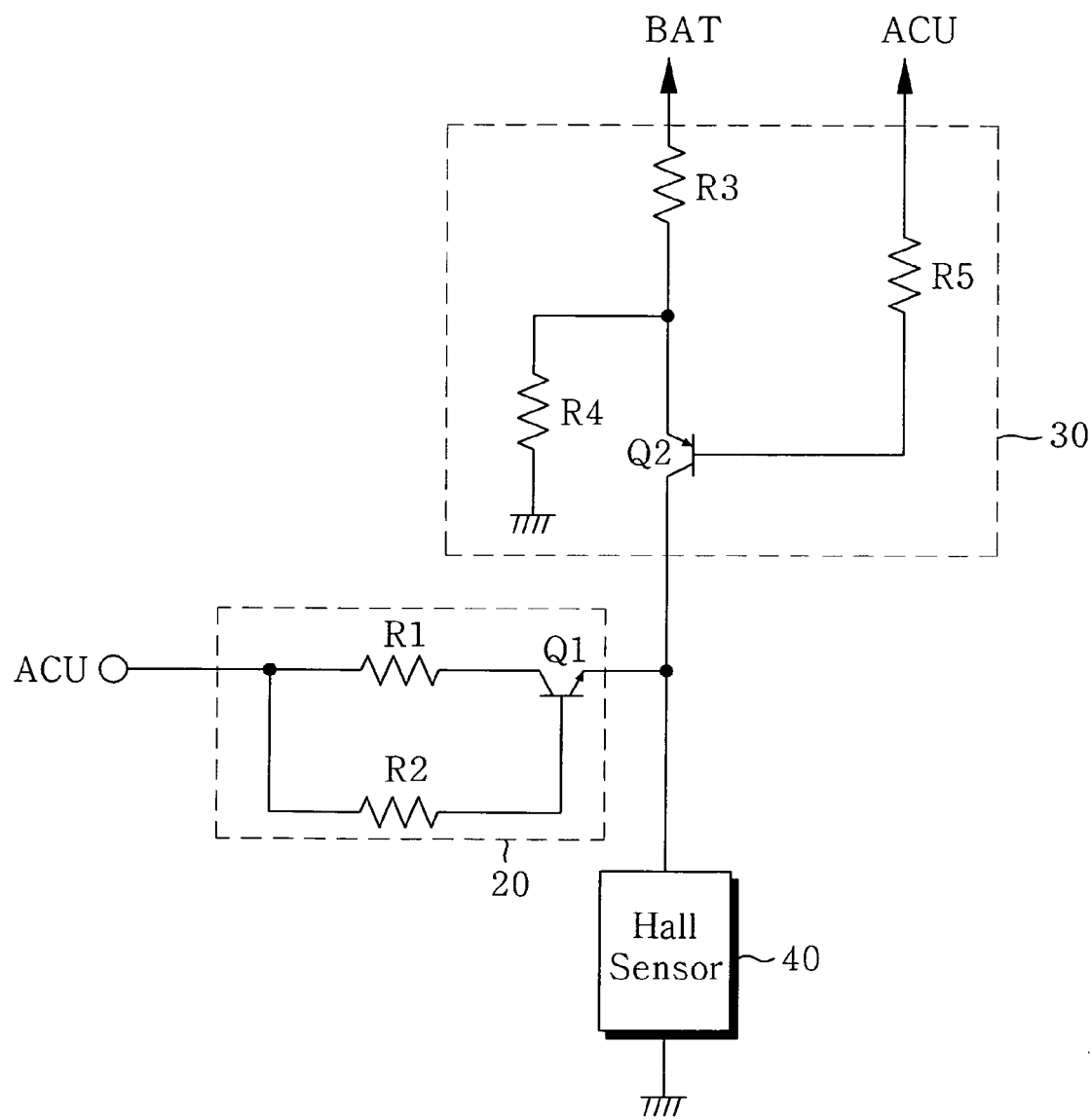
FIG. 5 is a detailed circuit diagram illustrating an apparatus for detecting a vehicle seat location in accordance with an embodiment of the present invention.

For the convenience of description, it is assumed that the hall sensor module 13 is identical with the hall sensor 40 (FIG. 5). In addition, it is also assumed that the vehicle seat location detection apparatus may be indicative of the hall sensor module 13, and may include the hall sensor module 13 and the ACU as necessary.

FIG. 5 is a detailed circuit diagram illustrating an apparatus for detecting a vehicle seat location in accordance with an embodiment of the present invention.

Referring to FIG. 5, the vehicle seat location detection apparatus according to the present invention includes a first power-supply unit 20, a second power-supply unit 30, and a hall sensor 40.

The hall sensor 40 configured in the form of a two-pin hall sensor may be part number "TLE4976L" manufactured by Infineon Company or equivalent. The hall sensor 40 detects the location of the target 14 according to a flux variation. In more detail, if a flux from the target 14 varies, the level of a supply current (Is) is changed according to the flux variation.

In other words, as shown in FIG. 4, when the target 14 is located at the location facing the hall sensor 40, the flux density (B) from the above-mentioned target 14 is relatively high, such that the supply-current (Is) level remains low in level as shown in FIG. 1. If the hall sensor 40 moves from the location facing the target 14, the flux density (B) is decreased, such that the supply-current level (Is) remains high in level.

The first power-supply unit 20 activates the hall sensor 40 during an active period (i.e., a high-level period) of a drive-voltage pulse generated from the ACU. The first power-supply unit 20 includes a first transistor Q1 and resistors R1 and R2. The first transistor Q1 emitter is connected to the power-supply pin (Vs) of the hall sensor 40, such that the drive-voltage pulse received from the ACU is applied to the power-supply pin (Vs) of the hall sensor 40. The resistors R1 and R2 are connected between base and collector terminals of the first transistor Q1 and the ACU pin acting as a pulse-input pin.

On the contrary, the second power-supply unit 30 provides an auxiliary power-supply signal (BAT) required to activate the hall sensor 40 during an inactive period (i.e., a low-level period) of the drive-voltage pulse. The second power-supply unit 30 includes voltage-division resistors R3 and R4 for dividing a battery voltage; and a second transistor Q2. The second transistor Q2 emitter is connected to a connection point of the voltage-division resistors R3 and R4, and transmits the divided voltages to the power-supply pin (Vs) of the hall sensor 40 according to a logic level of the drive-voltage pulse applied to a base terminal of the second transistor Q2 itself.

Operations of the above-mentioned vehicle seat location detection apparatus will hereinafter be described with reference to FIG. 5. The transistor Q1 of the first power-supply unit 20 is switched on during the active period (i.e., a high-level period) of the drive-voltage pulse generated from the ACU, such that a drive-voltage pulse having a high level is applied to the power-supply pin (Vs) of the hall sensor 40. The hall sensor 40 is activated by the above-mentioned high-level drive-voltage pulse, such that the ACU can detect the level of the supply current applied to the hall sensor 40.

In the meantime, if the drive-voltage pulse generated from the ACU is transitioned to a low level, the transistor Q1 of the first power-supply unit 20 is switched off, and the transistor Q2 of the second power-supply unit 30 is switched on, such that a high-level auxiliary power-supply signal (BAT) is applied to the power-supply pin (Vs) of the hall sensor 40. The activation status of the hall sensor 40 is maintained by the above-mentioned high-level auxiliary power-supply signal (BAT). As a result, the ACU can continuously detect the level value of the supply current detected during the active period of the drive-voltage pulse.

Therefore, according to the present invention, although the hall sensor module (or the target) is located in a hysteresis period, the ACU continuously detects a high-level supply current $I_{Shigh}$ or a low-level supply current $I_{Slow}$ in the active period of the drive-voltage pulse, such that it can solve problems of the conventional art for activating or blinking the air-bag warning lamp.

The hall sensor module 13 according to an embodiment of the present invention can easily connect or separate the sensor module 13 to/from the bracket 12 via the elastic fixed piece 16 as shown in FIG. 3(c), such that the installation and replacement of the hall sensor module 13 can be easily executed.

The vehicle seat location detection apparatus according to another embodiment of the present invention will hereinafter be described with reference to FIG. 6.

Figure 6:
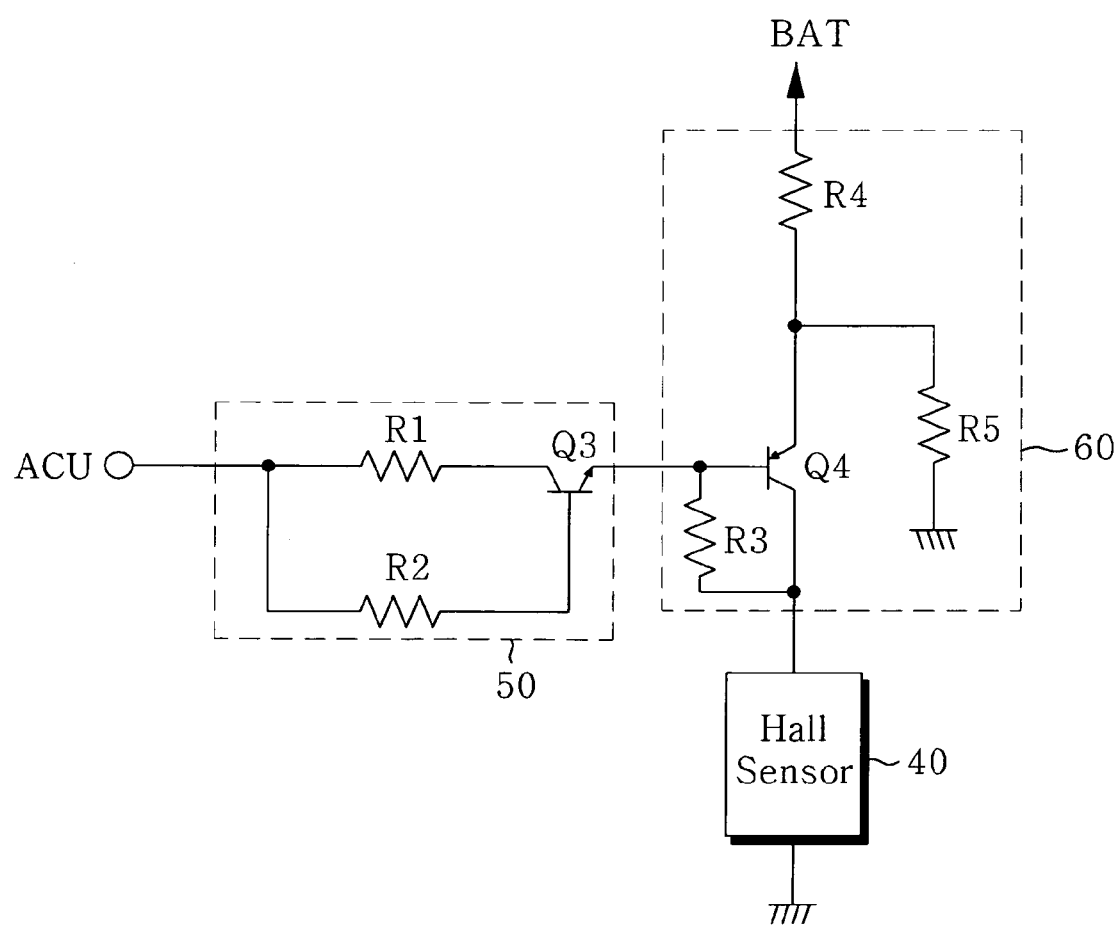
FIG. 6 is a detailed circuit diagram illustrating an apparatus for detecting a vehicle seat location in accordance with another embodiment of the present invention.

As shown in FIG. 6, the vehicle seat location detection apparatus according to another embodiment of the present invention includes a first power-supply unit 50, a second power-supply unit 60, and a hall sensor 40 in the same manner as in the above-mentioned embodiment of FIG. 5. Specifically, the first power-supply unit 50 and the hall sensor 40 are identical with the first power-supply unit 20 and the hall sensor 40, but the second power-supply unit 60 of FIG. 6 is different from the second power-supply unit 30 of FIG. 5. In more detail, the second power-supply unit 60 of FIG. 6 includes voltage-division resistors R4 and R5 for dividing a battery voltage (BAT) and a second transistor Q4. The second transistor Q4 emitter is connected to a connection point of the voltage-division resistors R4 and R5, and connects has its base connected to a base of a first transistor Q3 contained in the first power-supply unit 50, such that it transmits the divided voltages to the power-supply pin (Vs) of the hall sensor 40 according to a logic level of the drive-voltage pulse generated from the ACU.

According to the above-mentioned second embodiment shown in FIG. 6, only the transistor Q3 of the first power-supply unit 540 is switched on during the active period of the drive-voltage pulse generated from the ACU, such that a high-level drive-voltage pulse is applied to the power-supply pin (Vs) of the hall sensor 40. The hall sensor 40 is activated by the above-mentioned high-level drive-voltage pulse, such that the ACU can detect the level of the supply current applied to the hall sensor 40.

If the drive-voltage pulse generated from the ACU is transitioned to a low level, the transistor Q3 of the first power-supply unit 50 is switched off, and the transistor Q4 of the second power-supply unit 60 is switched on, such that a high-level auxiliary power-supply signal (BAT) is applied to the power-supply pin (Vs) of the hall sensor 40. The activation status of the hall sensor 40 is maintained by the above-mentioned high-level auxiliary power-supply signal (BAT). As a result, the ACU can continuously detect the level value of the supply current detected during the active period of the drive-voltage pulse.

Therefore, according to the second embodiment of the present invention, although the hall sensor module (or the target) is located in a hysteresis period, the ACU continuously detects a high-level supply current $I_{Shigh}$ or a low-level supply current $I_{Slow}$, such that it does not turn on or activate (or blink) the air-bag warning lamp.

The vehicle seat location detection apparatus according to yet another embodiment of the present invention will hereinafter be described with reference to FIG. 7.

Figure 7:
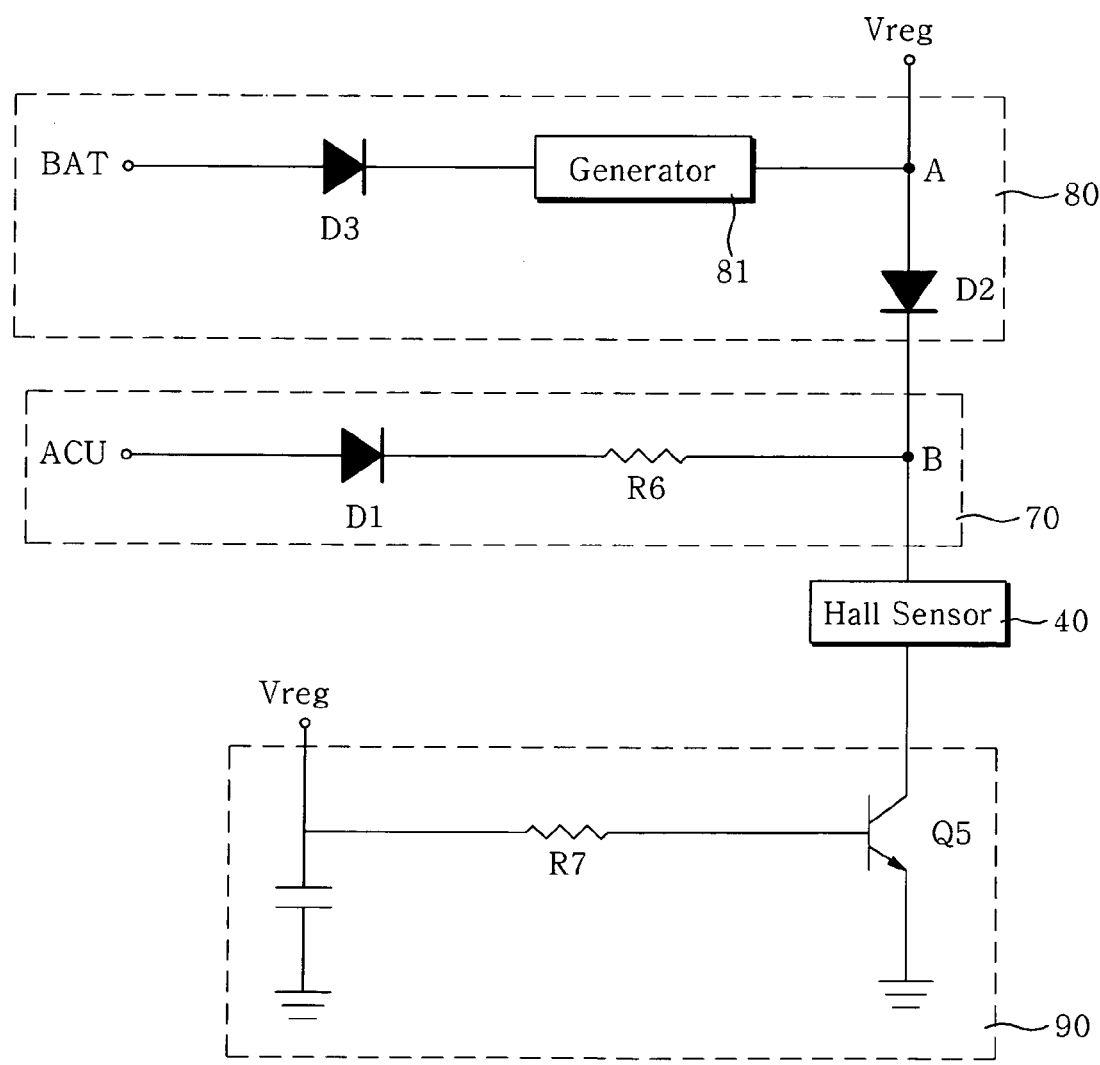
FIG. 7 is a detailed circuit diagram illustrating an apparatus for detecting a vehicle seat location in accordance with yet another embodiment of the present invention.

FIG. 7 is a detailed circuit diagram illustrating an apparatus for detecting a vehicle seat location in accordance with yet another embodiment of the present invention. Here, the vehicle seat location detection apparatus according to this embodiment of the present invention includes a first power-supply unit 70, a second power-supply unit 80, and a hall sensor 40 in the same manner as in FIGS. 5 and 6. Specifically, the hall sensor 40 shown in FIG. 7 is identical with the hall sensor 40 shown in FIG. 5.

The first and second power-supply units 70 and 80 contained in the vehicle seat location detection apparatus shown in FIG. 7 are different from those of FIG. 5. In more detail, the first power-supply unit 70 includes a first diode D1 and a first resistor R6. The first diode D1 forward terminal is connected to an output terminal of the drive-voltage pulse, and its reverse terminal is connected to the power-supply pin of the hall sensor 40, such that the drive-voltage pulse is applied to the power-supply pin of the hall sensor 40. The first resistor R6 is connected between the reverse terminal of the first diode D1 and the output terminal of the hall sensor 40.

The second power-supply unit 80 provides an auxiliary power-supply signal required to activate the hall sensor 40 during an inactive period of the drive-voltage pulse. The second power-supply unit 80 includes a generator 81 for transforming the voltage received from a vehicle battery into a fixed voltage suitable for activating the hall sensor 40, and outputting the transformed resultant voltage; and a second diode D2 for forward terminal is connected to the generator 81, and with its reverse terminal connected to the power-supply pin of the hall sensor 40.

The vehicle seat location detection apparatus according to the present invention further includes a load unit 90. The load unit 90 grounds a power-supply signal which has been outputted via the output terminal of the hall sensor after having been received from the first or second power-supply unit, such that it is driven by the power-supply signal of the second power-supply unit. The load unit 90 includes a transistor Q5 and a second resistor R7. The transistor Q5 emitter is connected to the output terminal of the hall sensor 40. Its collector is connected to a ground terminal, and its base is connected to a specific node at which the generator 81 is connected to the forward terminal of the second diode D2, such that it grounds the power-supply signal outputted via the output terminal of the hall sensor 40. The second resistor R7 divides a drive voltage generated from the generator 81 to power-supply signals suitable for operating the transistor Q5.

According to the above-mentioned third embodiment of the present invention, a power-supply signal of the first power-supply unit 70 and a power-supply signal of the second power-supply unit 80 are selectively applied to the hall sensor 40 by a voltage difference between the first power-supply unit 70 and the second power-supply unit 80, instead of the transistor driven according to the level of the drive-voltage pulse. In more detail, the voltage difference between the first and second power-supply units 70 and 80 is equal to a voltage difference between A and B nodes of FIG. 7, such that the second diode D2 is operated by the aforementioned voltage difference, and the power-supply signal of the first power-supply unit 70 and the power-supply signal of the second power-supply unit 80 are selectively applied to the hall sensor 40 according to the resultant operations of the second diode D2.

An active period of the drive-voltage pulse generated from the ACU (i.e., the first power-supply unit 70) receives a high-level drive-voltage pulse, and receives a voltage suitable for driving the hall sensor 40 from the generator 81 contained in the second power-supply unit 80. Preferably, the output signal of the generator 81 must be controlled to allow the drive-voltage pulse generated from the first power-supply unit 70 to be higher than the drive-voltage pulse generated from the second power-supply unit 80, such that the voltage seat location detection apparatus may not be affected by the auxiliary power-supply signal received from the second power-supply unit 80 when receiving the drive-voltage pulse from the first power-supply unit 70.

For example, the drive-voltage pulse generated from the first power-supply unit 70 corresponds to a voltage signal of about 5V, and the drive-voltage pulse generated from the second power-supply unit 80 corresponds to a voltage signal of about 3.3V. In more detail, the voltage signal of 3.3V is applied to the A node, the voltage signal of 5V is applied to the B node, and a voltage difference of 1.7V in a reverse direction occurs at both ends of the second diode D2 connected to the A node in a forward direction. Therefore, the drive voltage received from the second power-supply unit 80 is not applied to the hall sensor 40, and is applied to a base terminal of the transistor Q5 of the load unit 90, such that the transistor Q5 is switched off (i.e., an open status), such that the drive-voltage pulse received from the first power-supply unit 70 is grounded via the hall sensor 49 and the transistor Q5. As a result, the hall sensor 40 is activated by the drive-voltage pulse generated from the first power-supply unit 70, and the ACU can detect the level of the supply current applied to the hall sensor 40.

In the meantime, if the drive-voltage pulse is not generated from the ACU (i.e., the first power-supply unit 70) (i.e., if the drive-voltage pulse is in a low level), no voltage is applied to the B node, such that a forward potential difference of 3.3V occurs between both ends of the second diode D2. In this case, the voltage of 3.3V received from the second power-supply unit 80 operates the hall sensor 40. The above-mentioned potential difference is applied to a base terminal of the transistor Q4 of the load unit 90, such that the transistor Q5 is open. As a result, the drive voltage received from the second power-supply unit 80 is also grounded via the hall sensor 40 and the transistor Q5.

Therefore, the activation state of the hall sensor 40 is maintained by the power-supply signal received from the second power-supply unit 80, such that the ACU continuously detects the level value of the supply current detected in the active period of the drive-voltage pulse.

Therefore, according to the third embodiment of the present invention, although the hall sensor module (or the target) is located in a hysteresis period, the ACU continuously detects a high-level supply current $I_{Shigh}$ or a low-level supply current $I_{Slow}$, such that it does not turn on or activate the air-bag warning lamp.

According to characteristic aspects of the present invention, the ACU for use in the vehicle seat location detection apparatus according to the third embodiment of the present invention can recognize a drive status of the second power-supply unit 80 by determining whether the transistor Q5 of the load unit 90 is operated.

As described above, the transistor Q5 contained in the load unit 90 is switched on or off by the power-supply signal received from the second power-supply unit 80. If the second power-supply unit 80 is normally operated, the transistor Q5 of the load unit 90 is always switched on. Otherwise, provided that an unexpected malfunction occurs in the second power-supply unit 90 so that the power-supply signal is not applied to the transistor Q5, the corresponding transistor Q5 is switched off, such that the hall sensor 40 is not activated although the drive-voltage pulse is applied from the first power-supply unit 70 to the hall sensor 40.

Therefore, the ACU is unable to detect the level value of the supply current generated from the hall sensor 40 in an active period of the drive-voltage pulse. Therefore, the ACU determines whether the hall sensor 40 is activated or inactivated according to on/off states of the transistor Q5 contained in the load unit 90, such that it can determine whether a malfunction or error occurs in the second power-supply unit 80. For example, the ACU activates the air-bag warning lamp in order to inform a vehicle driver of the malfunction of the second power-supply unit 80.

Figure 8:
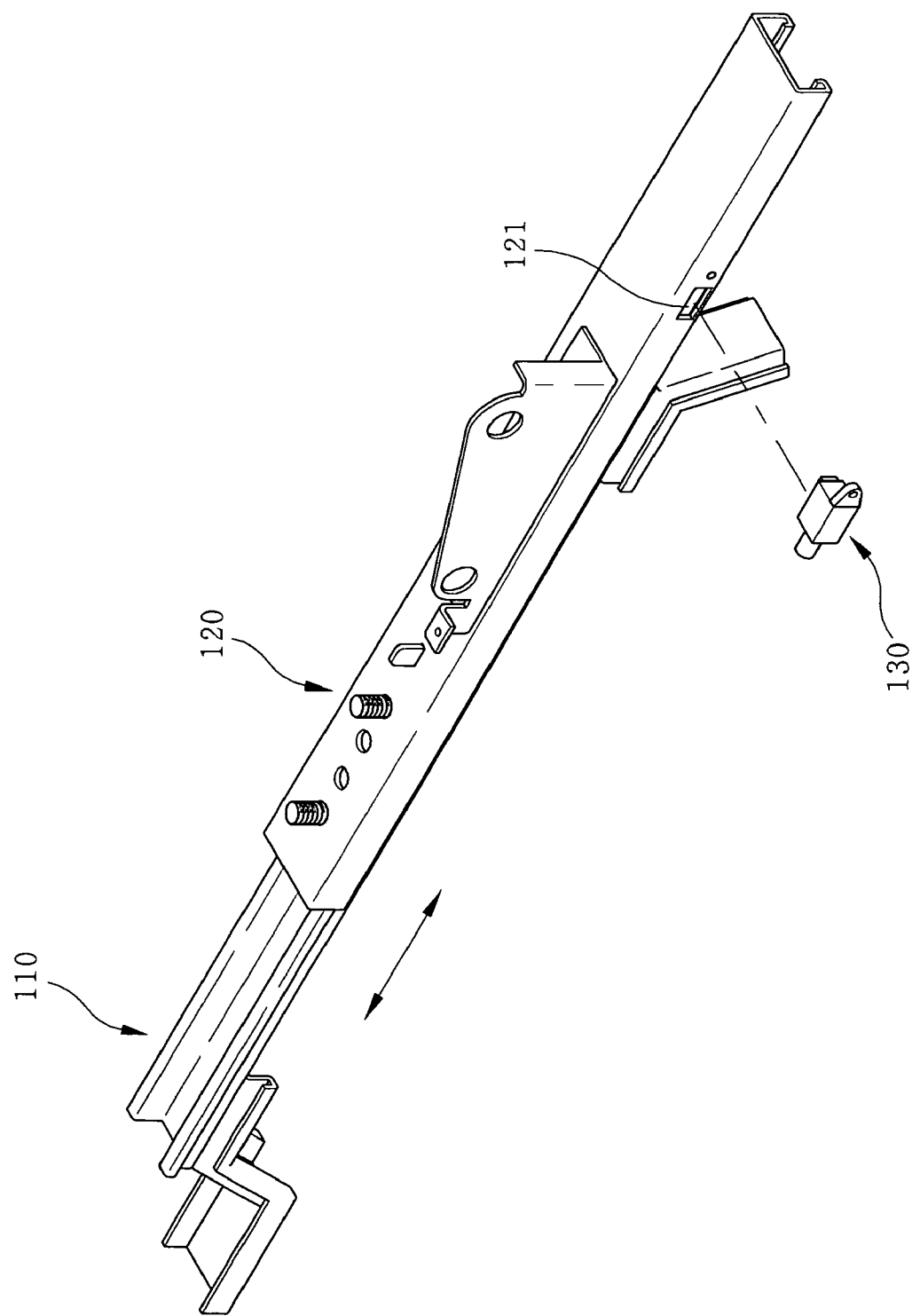
FIG. 8 shows an installation position and structural characteristics of an apparatus for detecting a vehicle seat location in accordance with yet another embodiment of the present invention.
Figure 9A:
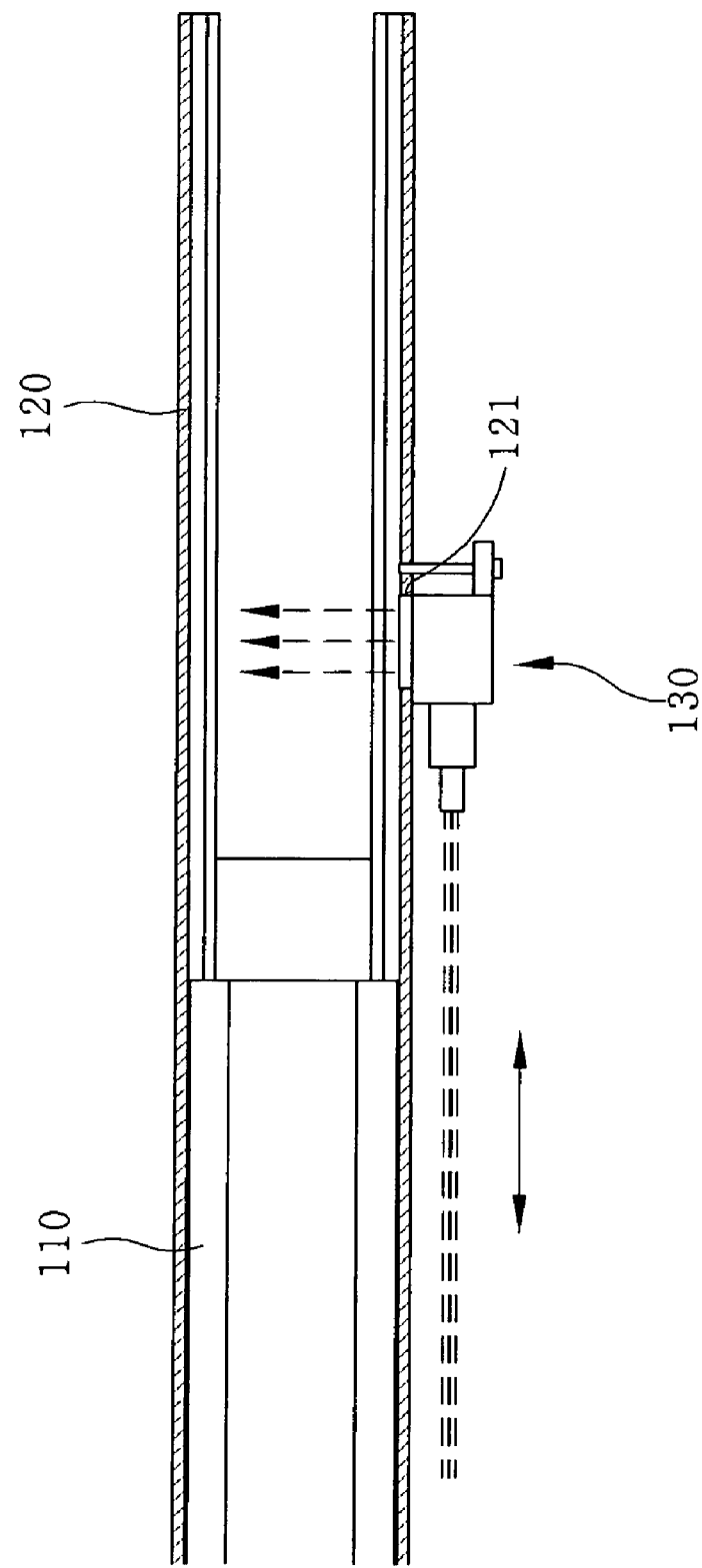
FIG. 9A is a plan view illustrating a forward movement of a vehicle seat according to the present invention.
Figure 9B:
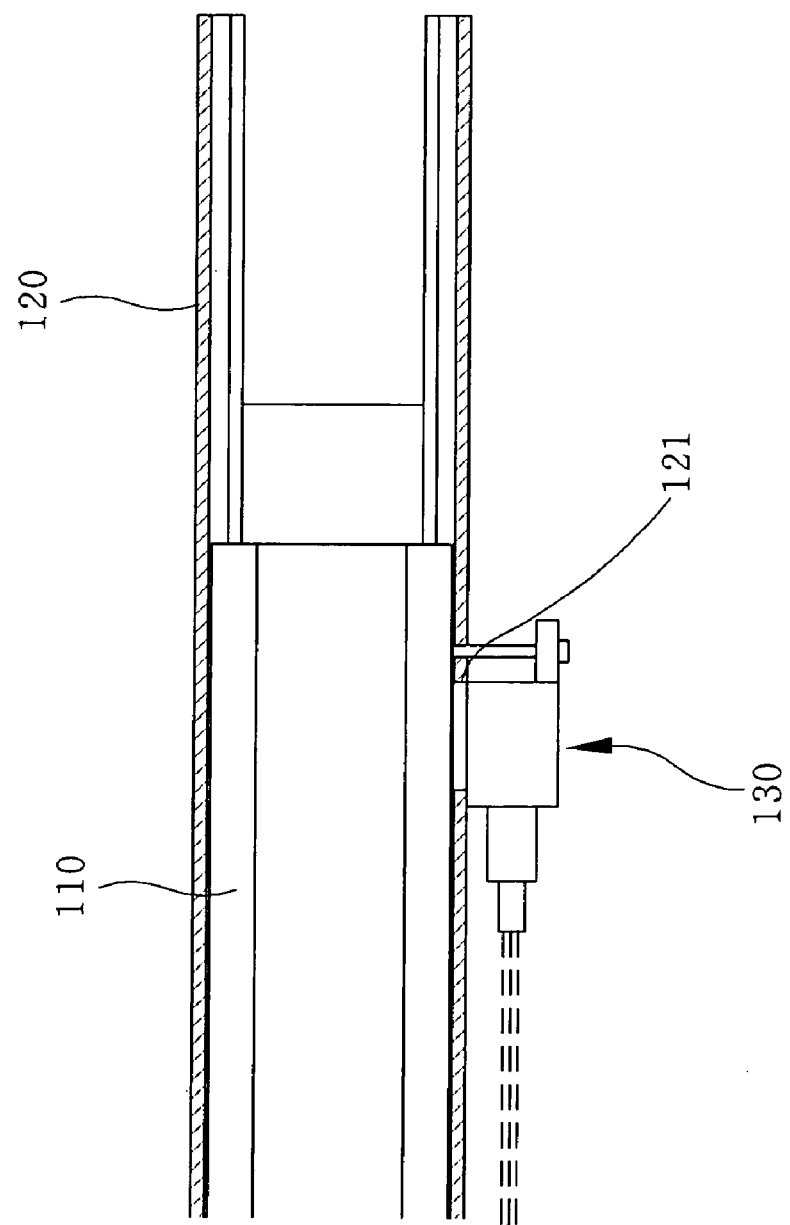
FIG. 9B is a plan view illustrating a backward movement of a vehicle seat according to the present invention.

FIGS. 8, 9A and 9B show an installation position of the vehicle seat location detection apparatus according to yet another embodiment of the present invention. The vehicle seat location detection apparatus of FIGS. 8, 9A, and 9B does not require installation of the ferromagnetic target, which must be additionally installed as shown in the above-mentioned first and second embodiments of the present invention. Further, the vehicle seat location detection apparatus uses a fixed rail 110 fixed to the bottom of an indoor space of the vehicle as the target, such that it can detect the vehicle seat location without encountering an additional mechanical modification.

As shown in FIG. 8, the vehicle seat location detection apparatus according to the present invention is integrated into a single hall sensor module 130, and the hall sensor module 130 is connected to a hall sensor module mounting hole 121 penetrating one surface of the guide track 120. The guide track 120 is connected to an external side of the fixed rail 110 fixed to the bottom of the indoor space of the vehicle, and moves forward and backward.

The hall sensor module mounting hole 121 penetrates one surface of the guide track 120, such that the fixed rail 110 is exposed via the hall sensor module mounting hole 121. In more detail, the hall sensor module 130 is fixedly connected to the hall sensor module mounting hole 121, and it is determined whether the fixed rail 110 of the hall sensor module 130 is detected according to the movement of the guide track 120, such that the hall sensor module mounting hole 121 detects the forward movement of the vehicle seat according to the determined result associated with the fixed rail 110.

FIGS. 9A~9B show operation states according to yet another embodiment of the present invention. As shown in FIGS. 9A~9B, if the guide track 120 moves forward when the hall sensor module mounting hole 121 is formed on a front lateral surface of the guide track 120, a distance between the vehicle seat and the air-bag becomes short. In this case, the hall sensor module 130 does not detect the fixed rail, the ACU detects a variation in flux density of a magnetic field emitted from the hall sensor, such that it can detect the vehicle seat approaching a vehicle's steering wheel.

Furthermore, as shown in FIG. 9B, if the guide track 120 moves backward and the distance between the vehicle seat and the steering wheel becomes longer, the hall sensor module 130 is in contact with the fixed rail 110, such that it can detect the fixed rail 110. In this case, the ACU can detect a variation in flux density of a magnetic field emitted from the hall sensor, such that it can recognize that the vehicle seat is more distant from the vehicle steering wheel according to the detected flux-density variation.

On the contrary, provided that the hall sensor module mounting hole 121 is located at the right side of the guide track 120, the guide track 120 moves forward, and the distance between the vehicle seat and the steering wheel becomes short, the hall sensor module 130 is in contact with the fixed rail 110, the ACU detects a variation in flux density of a magnetic field emitted from the hall sensor, and recognizes that the vehicle seat is close to the steering wheel.

If the guide track 120 moves backward such that the distance between the vehicle seat and the steering wheel is increased, the hall sensor module 130 cannot detect the fixed rail 110, and the ACU detects a variation in flux density of a magnetic field emitted from the hall sensor, and recognizes that the vehicle seat is more distant from the steering wheel.

As apparent from the above description, the vehicle seat location detection apparatus according to the present invention continuously transmits a drive voltage to a general two-pin hall sensor, such that it can effectively solve the two-pin hall sensor's problems caused by hysteresis characteristics.

The vehicle seat location detection apparatus can easily connect or detach a sensor module to/from a bracket via a bracket insertion groove and an elastic fixed piece formed in the bracket insertion groove, resulting in the facilitation of the easy installation and replacement of the hall sensor module.

Furthermore, the vehicle seat location detection apparatus forms a mounting hole on one surface of the guide track, includes a sensor module for detecting the location of the fixed rail, and detects the location of the fixed rail and the location of the guide track without using an additional target, such that it detects the vehicle seat location. As a result, there is no need to attach an additional target to the apparatus, and the construction of the apparatus is more simplified, resulting in greater convenience of use.

Although the present invention has disclosed a single module or apparatus in which the hall sensor and the first and second power-supply units are integrated, it may further include an air-bag controller unit (ACU), such that the ACU may be additionally integrated into the single hall sensor module or the single vehicle seat location detection apparatus.

Although the embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for detecting a vehicle seat position comprising:
    a hall sensor for detecting a target location according to a flux variation;
    a first power-supply unit for activating the hall sensor in an active period of a received drive-voltage pulse and for causing the hall sensor to determine a supply current level applied to the hall sensor while the hall sensor is not in a hysteresis period; and
    a second power-supply unit for providing an auxiliary power-supply signal to activate the hall sensor in an inactive period of the drive-voltage pulse while the hall sensor is in the hysteresis period and for causing the hall sensor to continue the detection of the supply current level determined during the active period.

2. The apparatus according to claim 1, wherein the first power-supply unit includes:

a first transistor having its emitter connected to a power-supply pin of the hall sensor; and resistors connected between base and collector terminals of the first transistor and a pulse input pin, whereby the drive-voltage pulse is applied to the power-supply pin of the hall sensor.

3. The apparatus according to claim 2, wherein the second power-supply unit includes:

voltage-division resistors for dividing a battery voltage;

a second transistor having its emitter connected to a connection point of the voltage-division resistors, and its base connected to the emitter of the first transistor, and transmitting a divided voltage to the power-supply pin of the hall sensor according to a logic level of the drive-voltage pulse; and a resistor connected to the base terminal and a collector terminal of the second transistor.

4. The apparatus according to claim 2, wherein the second power-supply unit includes:

voltage-division resistors for dividing a battery voltage; and a second transistor having its emitter connected to a connection point of the voltage-division resistors, and transmitting a divided voltage to the power-supply pin of the hall sensor according to a logic level of the drive-voltage pulse received in its base terminal.

5. The apparatus according to claim 4, wherein the hall sensor, the first power-supply unit, and the second power-supply unit are integrated into a single module, and the integrated module is inserted into a bracket connected to a guide track moving forward and backward along with a vehicle seat, such that the integrated module is detachably connected to the bracket.

6. The apparatus according to claim 4, wherein:

the hall sensor, the first power-supply unit, and the second power-supply are integrated into a single module, and the integrated module is fixedly connected to a hall sensor module mounting hole penetrating one surface of a guide track, which is connected to an external side of a fixed rail fixed to an indoor space of the vehicle and moves forward and backward, whereby the integrated module determines a contact or non-contact state of the fixed rail according to the forward/backward movement of the guide track, and outputs the determined result to an air-bag controller (ACU).

7. The apparatus according to claim 3 wherein the hall sensor, the first power-supply unit, and the second power-supply unit are integrated into a single module, and the integrated module is inserted into a bracket connected to a guide track moving forward and backward along with a vehicle seat, such that the integrated module is detachably connected to the bracket.

8. The apparatus according to claim 3, wherein:

the hall sensor, the first power-supply unit, and the second power-supply are integrated into a single module, and the integrated module is fixedly connected to a hall sensor module mounting hole penetrating one surface of a guide track, which is connected to an external side of a fixed rail fixed to an indoor space of the vehicle and moves forward and backward, whereby the integrated module determines a contact or non-contact state of the fixed rail according to the forward/backward movement of the guide track, and outputs the determined result to an air-bag controller (ACU).

9. An apparatus for detecting a vehicle seat position comprising:

a hall sensor for detecting a target location according to a flux variation;

an air-bag controller (ACU) for generating a drive-voltage pulse, transmitting the drive-voltage pulse to the hall sensor, and controlling the opening of an air-bag according to target detection information of the hall sensor;

a first power-supply unit located between the ACU and the hall sensor such that it activates the hall sensor in an active period of the drive-voltage pulse and for causing the hall sensor to determine a supply current level applied to the hall sensor while the hall sensor is not in a hysteresis period; and a second power-supply unit for providing an auxiliary power-supply signal to activate the hall sensor in an inactive period of the drive-voltage pulse while the hall sensor is in the hysteresis period and for causing the hall sensor to continue the detection of the supply current level determined during the active period.

10. The apparatus according to claim 9, wherein the first power-supply unit includes:

a first transistor for having its emitter connected to a power-supply pin of the hall sensor; and resistors connected between base and collector terminals of the first transistor and a pulse input pin, whereby the drive-voltage pulse is applied to the power-supply pin of the hall sensor.

11. The apparatus according to claim 10, wherein the second power-supply unit includes:

voltage-division resistors for dividing a battery voltage;

a second transistor for having its emitter connected to a connection point of the voltage-division resistors, its base connected to the emitter terminal of the first transistor, and transmitting a divided voltage to the power-supply pin of the hall sensor according to a logic level of the drive-voltage pulse; and a resistor connected to the base terminal and a collector terminal of the second transistor.

12. The apparatus according to claim 10, wherein the second power-supply unit includes:

voltage-division resistors for dividing a battery voltage; and a second transistor for having its emitter connected to a connection point of the voltage-division resistors, and transmitting a divided voltage to the power-supply pin of the hall sensor according to a logic level of the drive-voltage pulse.

13. The apparatus according to claim 12, wherein the hall sensor, the first power-supply unit, and the second power-supply unit are integrated into a single module, and the integrated module is inserted into a bracket connected to a guide track moving forward and backward along with a vehicle seat, such that the integrated module is detachably connected to the bracket.

14. The apparatus according to claim 12, wherein:

the hall sensor, the first power-supply unit, and the second power-supply are integrated into a single module, and the integrated module is fixedly connected to a hall sensor module mounting hole penetrating one surface of a guide track, which is connected to an external side of a fixed rail fixed to an indoor space of the vehicle and moves forward and backward, whereby the integrated module determines a contact or non-contact state of the fixed rail according to the forward/backward movement of the guide track, and outputs the determined result to the air-bag controller (ACU).

15. The apparatus according to claim 11 wherein the hall sensor, the first power-supply unit, and the second power-supply unit are integrated into a single module, and the integrated module is inserted into a bracket connected to a guide track moving forward and backward along with a vehicle seat, such that the integrated module is detachably connected to the bracket.

16. The apparatus according to claim 11, wherein:
the hall sensor, the first power-supply unit, and the second power-supply are integrated into a single module, and the integrated module is fixedly connected to a hall sensor module mounting hole penetrating one surface of a guide track, which is connected to an external side of a fixed rail fixed to an indoor space of the vehicle and moves forward and backward,
whereby the integrated module determines a contact or non-contact state of the fixed rail according to the forward/backward movement of the guide track, and outputs the determined result to the air-bag controller (ACU).

17. The apparatus according to claim 11 wherein the ACU calculates individual output data of a weight sensor, a vehicle speed sensor, an impact sensor, a head rest position sensor, a vehicle-seat back position sensor, and the hall sensor, and controls the air-bag opening operation according to the calculated result.

18. An apparatus for detecting a vehicle seat position comprising:
a hall sensor for detecting a target location according to a flux variation;
an air-bag controller (ACU) for generating a drive-voltage pulse, transmitting the drive-voltage pulse to the hall sensor, and controlling the opening of an air-bag according to target detection information of the hall sensor;
a first power-supply unit located between the ACU and the hall sensor such that it activates the hall sensor in an active period of the drive-voltage pulse; and
a second power-supply unit for providing an auxiliary power-supply signal to activate the hall sensor in an inactive period of the drive-voltage pulse, and including a generator and a second diode,
wherein the generator transforms the voltage received from a vehicle battery into a fixed voltage suitable for activating the hall sensor, and outputs the transformed resultant voltage, and
the second diode has its forward terminal connected to the generator, and its reverse terminal connected to the power-supply pin of the hall sensor.

19. The apparatus according to claim 18, wherein the first power-supply unit includes:
a first diode having its forward terminal connected to an output terminal of the drive-voltage pulse, and its reverse terminal connected to the power-supply pin of the hall sensor; and
a first resistor connected between the reverse terminal of the first diode,
whereby the drive-voltage pulse is applied to the power-supply pin of the hall sensor.

20. The apparatus according to claim 18, further comprising:
a load unit for grounding a power-supply signal which has been outputted via the output terminal of the hall sensor after having been received from the first or second power-supply unit, and being driven by the power-supply signal of the second power-supply unit.

21. The apparatus according to claim 20, wherein the load unit includes:
a transistor for having its emitter connected to an output terminal of the hall sensor, its collector connected to a ground terminal, and its base connected to a specific node at which the generator is connected to the forward terminal of the second diode, such that it grounds the power-supply signal outputted via the output terminal of the hall sensor; and
a second resistor for dividing a drive voltage generated from the generator to power-supply signals suitable for operating the transistor.

22. The apparatus according to claim 21 wherein the hall sensor, the first power-supply unit, and the second power-supply unit are integrated into a single module, and the integrated module is inserted into a bracket connected to a guide track moving forward and backward along with a vehicle seat, such that the integrated module is detachably connected to the bracket.

23. The apparatus according to claim 21, wherein:
the hall sensor, the first power-supply unit, and the second power-supply are integrated into a single module, and the integrated module is fixedly connected to a hall sensor module mounting hole penetrating one surface of a guide track, which is connected to an external side of a fixed rail fixed to an indoor space of the vehicle and moves forward and backward,
whereby the integrated module determines a contact or non-contact state of the fixed rail according to the forward/backward movement of the guide track, and outputs the determined result to the air-bag controller (ACU).

* * * * *